(12) United States Patent
Warke et al.

(10) Patent No.: US 11,092,674 B2
(45) Date of Patent: Aug. 17, 2021

(54) TRANSMIT SIGNAL DESIGN FOR AN OPTICAL DISTANCE MEASUREMENT SYSTEM

(71) Applicant: TEXAS INSTRUMENTS INCORPORATED, Dallas, TX (US)

(72) Inventors: Nirmal C. Warke, Saratoga, CA (US); David P. Magee, Allen, TX (US); Baher S. Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 460 days.

(21) Appl. No.: 15/649,413

(22) Filed: Jul. 13, 2017

(65) Prior Publication Data

US 2019/0018107 A1    Jan. 17, 2019

(51) Int. Cl.
| | |
|---|---|
| *G01S 7/48* | (2006.01) |
| *G01S 7/484* | (2006.01) |
| *G01S 17/10* | (2020.01) |
| *G01S 7/4865* | (2020.01) |
| *G01S 17/36* | (2006.01) |
| *G01S 17/42* | (2006.01) |
| *G01S 7/4915* | (2020.01) |

(52) U.S. Cl.
CPC .......... *G01S 7/484* (2013.01); *G01S 7/4865* (2013.01); *G01S 7/4915* (2013.01); *G01S 17/10* (2013.01); *G01S 17/36* (2013.01); *G01S 17/42* (2013.01)

(58) Field of Classification Search
CPC .......... G01S 17/10; G01S 17/87; G01S 17/89; G01S 7/4863; G01S 7/4816; G01S 7/484; G01S 7/486
See application file for complete search history.

(56) References Cited

U.S. PATENT DOCUMENTS

| | | |
|---|---|---|
| 9,219,487 B1 | 12/2015 | Stuhlberger et al. |
| 2013/0120565 A1 | 5/2013 | Wilks et al. |
| 2016/0003946 A1* | 1/2016 | Gilliland ............... G01S 17/894 356/5.01 |
| 2019/0317193 A9* | 10/2019 | O'Keeffe ............... G01S 17/42 |

FOREIGN PATENT DOCUMENTS

DE       102015114328 A1    3/2016

OTHER PUBLICATIONS

Final Office Action dated Jun. 11, 2021, U.S. Appl. No. 15/649,493, filed Jul. 13, 2017, 10 pages.

* cited by examiner

*Primary Examiner* — Luke D Ratcliffe
(74) *Attorney, Agent, or Firm* — Michelle F. Murray; Charles A. Brill; Frank D. Cimino

(57) ABSTRACT

An optical transmitting system for distance measuring includes a signal generator, a laser diode coupled to the signal generator, and an optics device. The signal generator is configured to generate a first plurality of electrical signals. The laser diode is configured to generate a first plurality of optical waveforms that correspond with the first plurality of electrical signals. The optics device is configured to receive the first plurality of optical waveforms and direct the first plurality of optical waveforms toward a first plurality of scan points that form a scan region within a field of view (FOV). A first signal type, a first signal duration, a first signal amplitude, or a first signal repetition frequency of the first plurality of optical waveforms is based on a first desired range of the first plurality of scan points.

19 Claims, 4 Drawing Sheets

TRANSMIT SIGNAL DESIGN FOR AN OPTICAL DISTANCE MEASUREMENT SYSTEM

BACKGROUND

Light Detection and Ranging (LiDAR, LIDAR, lidar, LADAR) is a system that measures the distance to an object by reflecting a laser pulse sequence (a single narrow pulse or sequence of modulated narrow pulses) off of one or more objects and analyzing the reflected light. More specifically, LiDAR systems typically determine a time of flight (TOF) for the laser pulse to travel from the laser to an object and return back to the system by analyzing either the correlation or the phase shift between the reflected light signal and the transmitted light signal. The distance to the object may then be determined based on the TOF. These systems may be used in many applications including: geography, geology, geomorphology, seismology, transport, and remote sensing. For example, in transportation, automobiles may include LiDAR systems to monitor the distance between the vehicle and other objects (e.g., another vehicle). The vehicle may utilize the distance determined by the LiDAR system to, for example, determine whether the other object, such as another vehicle, is too close, and automatically apply braking.

Many LiDAR systems use a rotating optical measurement system to determine distance information for objects in its field of view (FOV). The intensity of the reflected light is measured for several vertical planes through a full 360 degree rotation.

SUMMARY

In accordance with at least one embodiment of the disclosure, an optical distance measuring system includes a transmitter and a receiver. The transmitter is configured to generate a first plurality of optical waveforms for a first period of time and a second plurality of optical waveforms for a second period of time and direct the first plurality of optical waveforms toward a first object and the second plurality of optical waveforms toward a second object. The first plurality of optical waveforms is configured to be a different signal type or have a different signal duration, signal amplitude, or signal repetition frequency than the second plurality of optical waveforms. The receiver is configured to receive the first plurality of optical waveforms reflected off of the first object and the second plurality of optical waveforms reflected off the second object, determine a first distance to the first object based on a first time of flight from the transmitter to the first object and back to the receiver, and determine a second distance to the second object based on a second time of flight from the transmitter to the second object and back to the receiver.

Another illustrative embodiment is an optical transmitting system for optical distance measuring that includes a signal generator, a laser diode coupled to the signal generator, and an optics device. The signal generator is configured to generate a first plurality of electrical signals. The laser diode is configured to generate a first plurality of optical waveforms that correspond with the first plurality of electrical signals. The optics device is configured to receive the first plurality of optical waveforms and direct the first plurality of optical waveforms to a first plurality of scan points that form a scan region within a field of view (FOV). A first signal type, a first signal duration, a first signal amplitude, or a first signal repetition frequency of the first plurality of optical waveforms is based on a first desired range of the first plurality of scan points.

Yet another illustrative embodiment is a method for determining a distance to a plurality of objects. The method includes generating, by a transmitter, a first plurality of optical waveforms for a first desired range. The first plurality of optical waveforms are a first signal type and have a first signal duration, a first signal amplitude, and a first signal repetition frequency. The first signal type, the first signal duration, the first signal amplitude, and the first signal repetition frequency are based on the first desired range. The method also includes steering the first plurality of optical waveforms to a plurality of scan points that form a scan region within a field of view (FOV). The method also includes generating, by the transmitter, a second plurality of optical waveforms for a second desired range different from the first desired range. The second plurality of optical waveforms are a second signal type and have a second signal duration, a second signal amplitude, and a second signal repetition frequency. The second signal type, the second signal duration, the second signal amplitude, and the second signal repetition frequency are based on the second desired range. The method also includes steering the second plurality of optical waveforms to the plurality of scan points.

BRIEF DESCRIPTION OF THE DRAWINGS

For a detailed description of various examples, reference will now be made to the accompanying drawings in which.

NOTATION AND NOMENCLATURE

Figure 1:
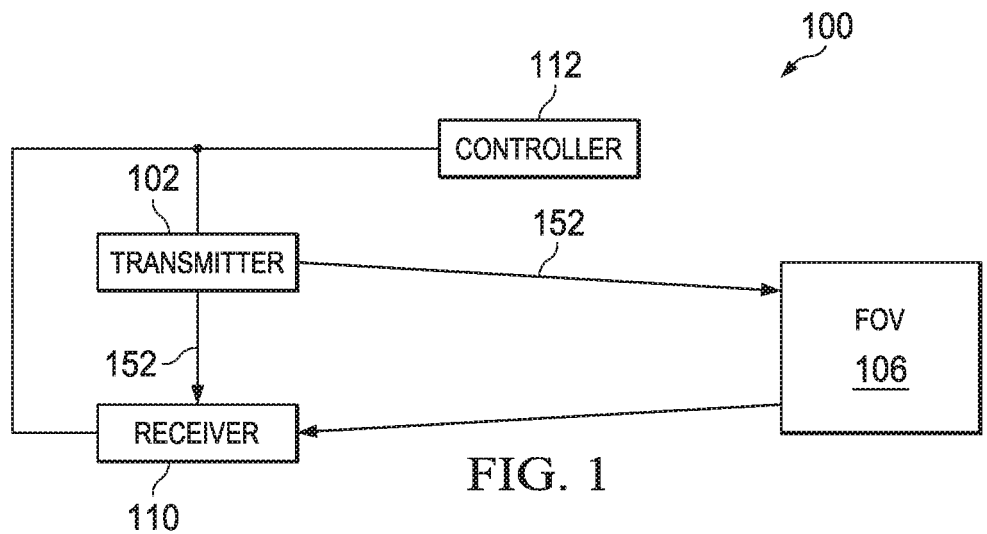
FIG. 1 shows an illustrative optical distance measuring system in accordance with various examples.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Optical distance measurement systems, such as LiDAR systems, may determine distances to various objects utilizing the time of flight (TOF) of an optical signal (e.g., a light signal) to the object and its reflection off an object back to the LiDAR system (return signal). These systems may be used in many applications including: geography, geology, geomorphology, seismology, transport, and remote sensing. For example, in transportation, automobiles may include LiDAR systems to monitor the distance between the vehicle and other objects (e.g., another vehicle). The vehicle may utilize the distance determined by the LiDAR system to, for example, determine whether the other object, such as another vehicle, is too close, and automatically apply braking.

Some LiDAR systems scan their FOV (e.g., using a rotating optical system) to determine distance information for objects in its FOV. The intensity of the reflected light is measured for several vertical planes through a full 360 degree rotation. For example, these LiDAR systems can use a rotating set of transmit and receive optics. For each scan plane, a light beam is transmitted and received at each angular position of the rotating system (e.g., a light beam is transmitted to a number of scan points in a grid pattern in the FOV and reflected off objects located at the scan points). When complete, a three dimensional (3D) image of the FOV may be generated.

In conventional systems, the transmit signal is designed for the maximum distance desired to measure. Therefore, the transmitted optical signal is always transmitted at full power. If multiple objects are within the FOV, the reflection from objects in close proximity can be so strong that it prevents the delayed weaker reflection from further objects from being detected due to saturation and recovery time of the receive photodetector sensor. For monocular LiDAR systems (e.g., systems that utilize a single lens for the transmitter and the receiver to direct the optical signals), dirt, water droplets, other foreign objects, and/or other impurities can cause strong reflections of the transmit signal back to the receiver. Such a reflection signal received by the receiver (or any other reflection signal received by the receiver after being reflected off other close objects) can be so strong so as to saturate the front end of the receiver. However, if the transmit signal is too small, the power in the reflected signal for farther objects may be so low that it is lost in noise. Therefore, there is a need to develop an optical distance measurement system that reliably detects objects that are near to and far from the system.

In accordance with various examples, an optical distance measuring system is provided that interleaves various power levels for the transmit signal so that near objects and far objects within the FOV are reliably detected. In other words, the transmit signal may be adjusted based on a desired range of a particular scan. For short range scans (e.g., for scans less than 10 meters), a pulse signal, with a relatively short signal duration, a relatively low peak optical power (e.g., a relatively low signal amplitude), and a relatively high signal repetition frequency, in an embodiment, is used. The pulse signal provides a fast rise time allowing for higher resolution. For longer range scans (e.g., for scans greater than 10 meters), a pulsed sequence or a continuous amplitude modulated signal, with a relatively longer signal duration, a relatively higher peak optical power, and a relatively lower signal repetition frequency, in an embodiment, is used. More generally, the type of signal, the signal duration, the signal amplitude, and/or the signal repetition frequency may be adjusted based on the desired range of any particular scan, thereby optimizing performance.

FIG. 1 shows an illustrative optical distance measuring system 100 in accordance with various examples. The optical distance measuring system 100 includes a transmitter 102, a receiver 110, and a controller 112. The transmitter 102 is configured, in some embodiments by the controller 112, to generate a plurality of optical waveforms 152. In some embodiments, the optical waveforms 152 are single tones (e.g., continuous waves), single tones with phase modulation (e.g., phase shift keying), multiple tones with fixed frequencies (e.g., frequency shift keying), signals with frequency modulation over a frequency range (e.g., chirps), and/or signals with narrowband, pulse position modulation. In some embodiments, the type of optical waveform generated by the transmitter 102 is based on the desired range (e.g., the desired distance that the system is to measure objects) of a scan. For example, for a short range scan (e.g., less than 10 meters), the optical waveforms 152 are single tones. For a longer range scan (e.g., greater than 10 meters), the optical waveforms 152 are signals with pulse position modulation (i.e., a pulse sequence) and/or continuous amplitude modulated waveforms.

The transmitter 102 is also configured, in an embodiment, to direct the optical waveforms 152 toward the FOV 106. In some embodiments, a beam steering device (not shown) may receive the optical waveforms 152 from the transmitter 102 and steer the optical waveforms 152 to the FOV 106. More, particularly, the transmitter 102 and/or the beam steering device directs/steers the optical waveforms 152 to a plurality of scan points. For example, the transmitter 102 and/or the beam steering device (which, in some embodiments, is a solid state device with controllable micromirrors or a phased array, a motorized platform attached to a laser, a rotatable mirror, and/or any other device for beam steering) is configured to direct/steer one optical waveform to a first scan point in the FOV 106 and direct/steer a second optical waveform to a second scan point in the FOV 106. In this way, a scan of one or more scan regions, each containing a number of scan points within the FOV, is performed.

Each optical waveform 152 can reflect off of an object within the FOV 106. Each reflected optical waveform 152 is then received by the receiver 110. In some embodiments, an additional beam steering device (not shown) steers each reflected optical waveform 152 to the receiver 110. In some embodiments, the receiver 110 receives each reflected optical waveform 152 directly from an object in the FOV 106.

The receiver 110 is configured to receive each reflected optical waveform 152 and determine the distance to objects within the FOV 106 based on the TOF from the transmitter 102 to the object and back to the receiver 110 of each optical waveform 152. For example, the speed of light is known, so the distance to an object is determined and/or estimated using the TOF. That is, the distance is estimated as $$d = \frac{c * TOF}{2}$$

where d is the distance to the object, c is the speed of light, and TOF is the time of flight. The speed of light times the TOF is halved to account for the travel of the optical waveform to, and from, the object. In some embodiments, the receiver 110, in addition to receiving each reflected optical waveform 152 reflected off an object within the FOV 106, is also configured to receive each optical waveform 152, or a portion of each optical waveform 152, directly from the transmitter 102. The receiver 110, in an embodiment, is configured to convert the optical signals into electrical signals, a received signal corresponding to each reflected optical waveform 152 and a reference signal corresponding to each optical waveform 152 received directly from the transmitter 102. The receiver 110 then, in an embodiment, performs a correlation function using the reference signal and the received signal. A peak in the correlation function corresponds to the time delay of each received reflected optical waveform 152 (i.e., the TOF). The distance can then be estimated using the formula discussed above. In other embodiments, a fast Fourier transform (FFT) can be performed on the received signal. A phase of the tone is then used to estimate the delay (i.e., TOF) in the received signal. The distance can then be estimated using the formula discussed above.

As discussed above, multiple optical waveforms 152 may be generated and, each one directed to a different scan point of the scan region within the FOV 106. Thus, distance information of an object at each scan point is determined by the system 100. Therefore, the system 100 can provide an "image" based on distance measurements of the scan region within the FOV 106.

The optical distance measuring system 100 is configured, in an embodiment, to conduct multiple scans of the FOV 106, all in the same manner as discussed above. Each scan, in an embodiment, can be directed at objects within the FOV 106 that are at different ranges. For example, a first scan can have a desired range (e.g., the distance in the FOV 106 desired to be scanned) that is a short distance (e.g., less than 10 meters) from the optical distance measuring system 100 while a second scan can have a desired range that is set for a longer distance (e.g., greater than 10 meters). Thus, the transmitter 102 is configured, in an embodiment, to transmit optical waveforms 152 based on the desired range. Hence, the type of signal transmitted (i.e., the signal type), the duration of the signal (i.e., signal duration), the power of the signal transmitted (i.e., signal amplitude), and/or the repetition frequency of the signal transmission (i.e., signal repetition frequency) is based on the desired range. In other words, while conventional optical distance measuring systems have fixed signal type, fixed signal duration, fixed signal amplitude, and fixed signal repetition frequency transmission schemes, optical distance measuring system 100 varies the signal type, signal duration, signal amplitude, and/or signal repetition frequency based on the desired range of a scan. As a result, the system can more efficiently regulate the transmitted optical power based on the calculated range of objects in the FOV to meet eye safety requirements.

For short range scans (e.g., less than 10 meters), the transmitter 102 is, in an embodiment, configured to generate pulse optical waveforms 152. These pulse optical waveforms provide a fast rise time. Because range accuracy is based on the rise time of the pulse, these fast rise time pulses provide a relatively high resolution for distance determination. In some embodiments, because the range is short, the pulse optical waveforms 152 are not modulated because interference from other optical distance measuring systems is unlikely due to the short round trip time from the transmitter 102 to an object and back to the receiver 110. For longer range scans (e.g., greater than 10 meters), the transmitter 102 is, in an embodiment, configured to generate a sequence of pulses and/or a continuous amplitude modulated waveform as the optical waveforms 152.

In an embodiment, the signal duration for short range scans (e.g., less than 10 meters) is set to $$\text{duration} < \frac{2 * d_{min}}{c}$$

where duration is the signal duration, $d_{min}$ is the minimum distance for the optical distance measuring system 100, and c is the speed of light. This configuration allows the optical waveform 152 to be fully transmitted prior to any portion of the reflected optical waveform 152 being received. For longer range scans (e.g., greater than 10 meters), the signal duration is less than the round trip time of the previous optical waveform 152 (e.g., the time for the optical waveform 152 to travel from the transmitter 102 to an object within the FOV 106 and the reflected optical waveform 152 be received by the receiver 110). Therefore, the closer the desired range, the lower the signal duration.

The signal amplitude is also lower for short range scans than for longer range scans so as to not saturate the receiver 110 with high power reflected waveforms. In an embodiment, the signal amplitude for a short range scan (e.g., less than 10 meters) is based on the noise floor (detectable with specified performance) for worst case conditions of minimum reflectivity and maximum range. Therefore, the closer the desired range, the lower the signal amplitude. For longer range scans (e.g., greater than 10 meters), the signal amplitude, in an embodiment, is chosen so that the received reflected optical waveform 152 is detectable with specified performance. In some embodiments, the peak power is maximized prior to increasing pulse length to optimize signal-to-noise ratio (SNR) tradeoff.

The signal repetition frequency can be higher for short range scans than for longer range scans. In an embodiment, the signal repetition frequency is based on the round trip time of optical waveform 152 from the transmitter 102 to the object and back to the receiver 110 (e.g., the transmitter 102 generates a subsequent optical waveform after the first optical waveform is received by the receiver 110). Because short range scans have a lower round trip time than longer range scans, optical waveforms 152 are generated by the transmitter 102 at a higher frequency for short range scans than for longer range scans.

In some embodiments, the receiver 110 also includes a silence period that varies based on the desired scan range. For short range scans (e.g., less than 10 meters), the receiver 110 is configured, in an embodiment, to ignore signals that are received from beyond the desired range (e.g., from beyond 10 meters). Thus, the distance to objects within the desired range of the scan is measured while other objects are ignored. For longer range scans (e.g., greater than 10 meters), the receiver 110 is configured, in an embodiment, to ignore any signal received during transmission. Thus, closer range object signals (e.g., signals within 10 meters which may saturate the receiver 110) are ignored while the distance to objects that have a longer range (e.g., greater than 10 meters) are measured. In another embodiment, long range scans are avoided at locations (e.g., scan points) where an object has been detected at short range to avoid saturating the receiver 110.

In some embodiments, controller 112 computes the distance measurements to the objects within the scan region and determines the parameters of the optical waveform 152 that is generated by the transmitter 102, in some embodiments, based on a desired range. The controller 112 can be any type of processor, controller, microcontroller, and/or microprocessor with an architecture optimized for processing the distance measurement data received from receiver 110 and controlling the transmitter 102. For example, the controller 112 may be a digital signal processor (DSP), a central processing unit (CPU), a reduced instruction set computing (RISC) core such as an advanced RISC machine (ARM) core, a mixed signal processor (MSP), a field programmable gate array (FPGA), etc.

Figure 2:
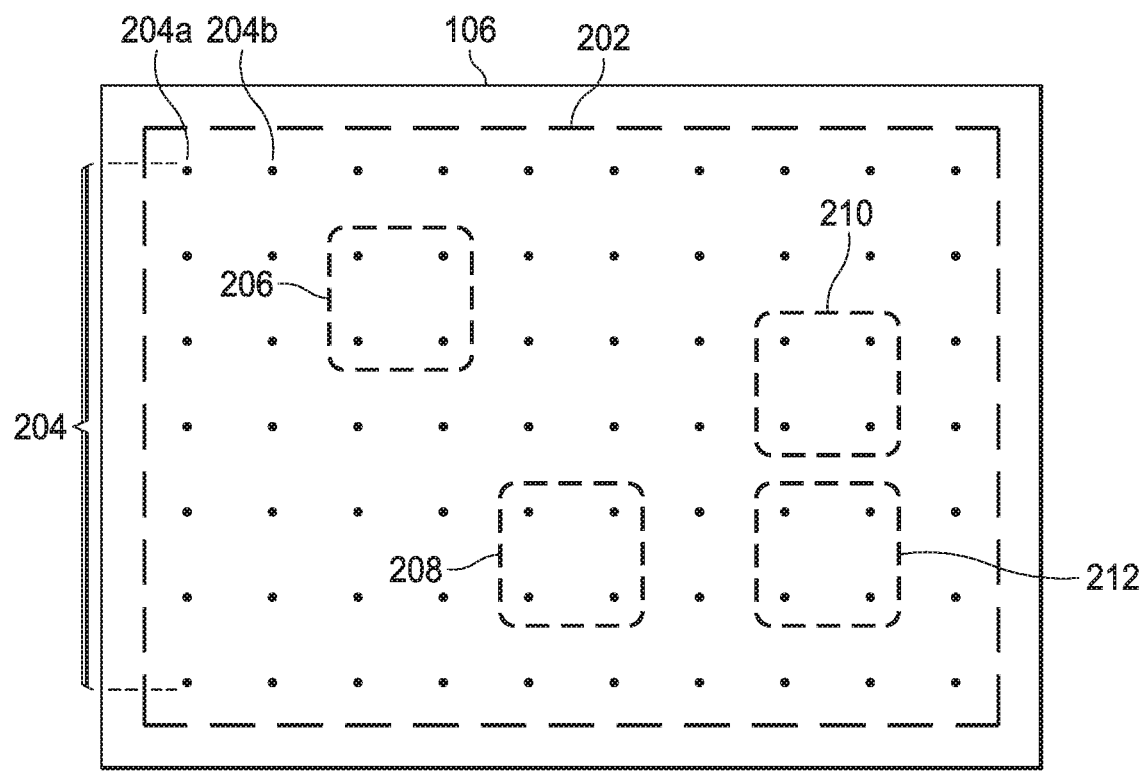
FIG. 2 shows an illustrative scan region within a FOV that is scanned by an optical distance measuring system in accordance with various examples.

FIG. 2 shows an illustrative scan region 202 within FOV 106 that is scanned by an optical distance measuring system 100 in accordance with various examples. In the example shown in FIG. 2, the FOV 106 includes a scan region 202. Within the FOV 106 and the scan region 202 are objects 206, 208, 210, and 212. In some examples, the objects 206, 208, 210, and 212 may vary in distance from the optical distance measuring system 100 (e.g., objects 206 and 208 can be closer to the optical distance measuring system 100 than objects 210 and 212). In an embodiment, the scan region 202 is a rectangular uniform scan region that covers the entire, or most of the FOV 106. The scan region 202 includes multiple scan points 204 that cover the entire scan region 202. Thus, in an embodiment, a first optical waveform 152 is directed to scan point 204a, and a distance measurement is made to any object located at scan point 204a. A second optical waveform 152 is directed to scan point 204b, and a distance measurement is made to any object located at scan point 204b. In this way, all of the scan points 204 are scanned and distances to objects, including objects 206, 208, 210, and 212 are determined.

As discussed above, in an embodiment, a scan of the scan region 202 is conducted more than one time. In other words, a distance to objects at each scan point 204 is determined at different times. In an embodiment, at least two of the scans have different desired ranges and thus, utilize different transmit signal designs (e.g., signal type, signal duration, signal amplitude, and/or signal repetition). For example, the controller 112 can cause, for a first scan, the transmitter 102 to generate optical waveforms 152 for a short range (e.g., less than 10 meters) scan. Thus, the transmitter 102 transmits optical waveforms 152 with a signal type, signal duration, signal amplitude, and/or signal repetition frequency optimized for a short range scan as discussed above to scan points 204. Once the first scan is completed, the controller 112 may cause, for a second scan, the transmitter 102 to generate optical waveforms 152 for a longer range (e.g., greater than 10 meters) scan. Thus, the transmitter 102 transmits optical waveforms 152 with a signal type, signal duration, signal amplitude, and/or signal repetition frequency optimized for a longer range scan as discussed above to scan points 204. The optical distance measuring system 100 may conduct multiple scans optimized for any desired range.

In some embodiments, the scans of scan region 202 depicted in FIG. 2 are utilized to identify objects of interest. For example, the controller 112, in an embodiment, computes the distance measurements to the objects 206-212 within the scan region 202 and determines, based on the scans of the uniform scan region 202, what objects of interest within the FOV 106 to further focus on. For example, if a determination is made that objects 210 and 212 are moving at a relative velocity above a threshold level with respect to the system 100, the controller 112 determines that the objects 210 and 212 are objects of interest. In response to the objects of interest determination, the controller 112, in an embodiment, causes the transmitter 102 to generate and transmit optical waveforms 152 optimized with a range approximately equivalent to the distance to the objects of interest to continue to scan the scan region 202. For example, if the distance to the objects 210 and 212 is 20 meters, then the controller 112 causes the transmitter 102 to generate and transmit optical waveforms 152 with signal type, a signal duration, a signal amplitude, and/or a signal repetition frequency optimized for a desired range of 20 meters.

The optical distance measuring system 100 then, in an embodiment, continues to scan the scan region 202 optimized to the desired range of the object(s) of interest. However, interleaved at any frequency with the scans optimized to the desired range of an object of interest are, in some embodiments, scans optimized to one or more other desired ranges to determine whether any new and/or other object should be added to the objects of interest to be tracked. In this way, the optical distance measurement system 100 reliably detects both objects that are near and far to the system and can continually track those objects without saturating the receiver 110 or losing a reflected optical waveform 152 in the noise.

Figure 3:
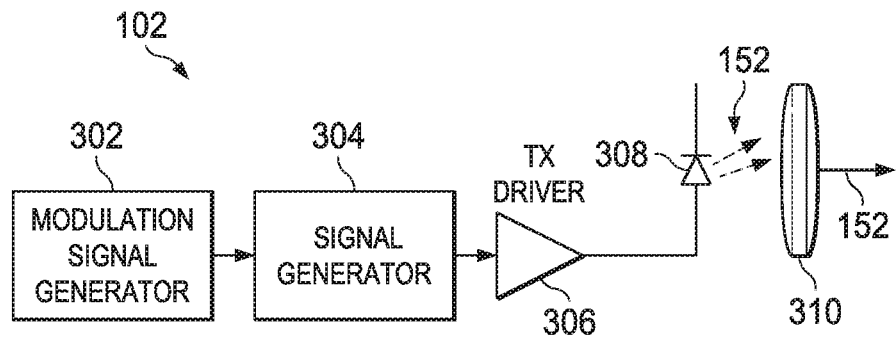
FIG. 3 shows an illustrative transmitter for an optical distance measuring system in accordance with various examples.

FIG. 3 shows an illustrative transmitter 102 for distance measuring system 100 in accordance with various examples. The transmitting system 102 includes a modulation signal generator 302, a signal generator 304, a transmission driver 306, a laser diode 308, and an optics device 310 (e.g., a lens). The modulation signal generator 302 is configured to provide a phase, frequency, amplitude, and/or position modulation reference signal for longer range scans (e.g., greater than 10 meters). For short range scans (e.g., less than 10 meters), the modulation signal generator 302 does not, in an embodiment, generate any modulation reference signals. In some embodiments, the modulation signal generator 302 is configured to generate single tones (i.e. continuous waves), single tones with phase modulation (e.g. phase shift keying), single tones with amplitude modulation (e.g. amplitude shift keying), multiple tones with fixed frequencies (e.g. frequency shift keying), signals with frequency modulation over a narrowband frequency range (e.g. chirps), and/or signals with narrowband, pulse position modulation. The signal generator 304 is configured to generate pulse sequences and/or continuous waveforms using the reference signal from the modulation signal generator 302 for longer range (e.g., greater than 10 meters) scans. The signal generator 304 serves as a pulse sequence generator and/or continuous waveform generator using the modulation signal as a reference. For short range scans (e.g., less than 10 meters), the signal generator 304 is configured, in an embodiment, to generate single pulses. The transmit driver 306 generates a current drive signal to operate an optical transmitter such as laser diode 308 which generates the optical waveforms 152 corresponding to the electrical signals generated by the signal generator 304. The optics device 310 (e.g., a lens) is configured to direct (e.g., focus) the optical waveforms 152 (e.g., the modulated light signals and/or light pulses) toward the scan points 204 in the FOV 106. For example, the optics device 310 can direct the optical waveforms 152 directly to the scan points 204 in the FOV 106 and/or to a beam steering device that further steers the optical waveforms 152 to the scan points 204 in the FOV 106.

Figure 4:
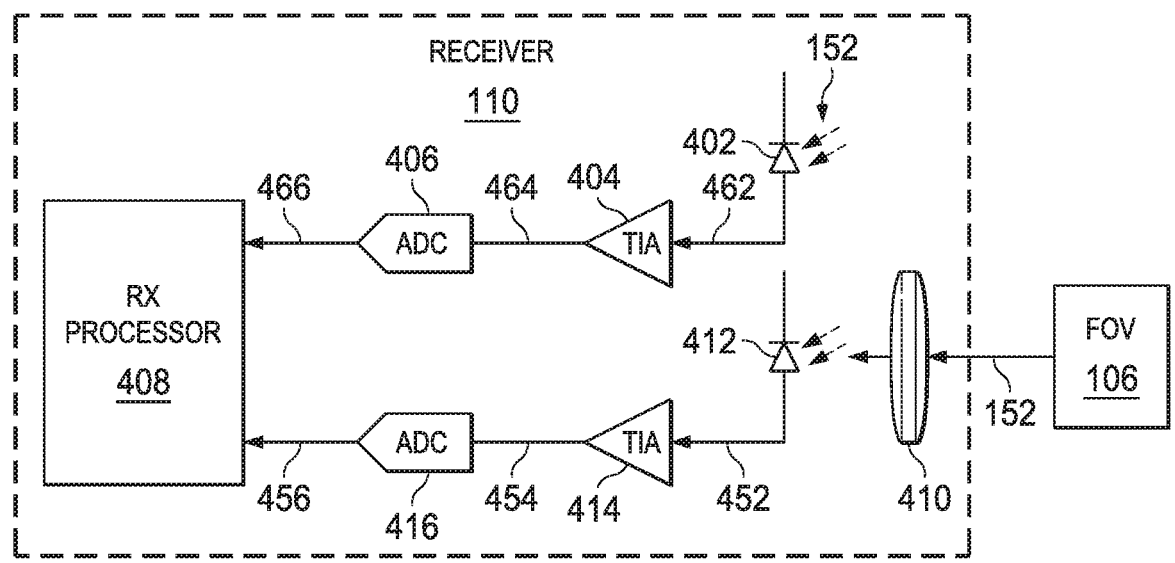
FIG. 4 shows an illustrative receiver for an optical distance measuring system in accordance with various examples.

FIG. 4 shows an illustrative optical receiver 110 for distance measuring system 100 in accordance with various examples. The receiver 110 includes, in an embodiment, an optics device 410 (e.g., a lens), two photodiodes 402 and 412, two trans-impedance amplifiers (TIAs) 404 and 414, two analog-to-digital converters (ADCs) 406 and 416, and a receiver processor 408. As discussed above, in an embodiment, the reflected optical waveforms 152 are received by the receiver 110 from the FOV 106. The optics device 410, in an embodiment, receives the each reflected optical waveform 152. The optics device 410 directs (e.g., focuses) each reflected optical waveform 152 to the photodiode 412. The photodiode 412 is configured to receive each reflected optical waveform 152 and convert each reflected optical waveform 152 into current received signal 452 (a current that is proportional to the intensity of the received reflected light). TIA 414 is configured to receive current received signal 452 and convert the current received signal 452 into a voltage signal, designated as voltage received signal 454 that corresponds to the current received signal 452. ADC 416 is configured to receive the voltage received signal 454 and convert the voltage received signal 454 from an analog signal into a corresponding digital signal, designated as digital received signal 456. Additionally, in some embodiments, the current received signal 452 is filtered (e.g., band pass filtered) prior to being received by the TIA 414 and/or the voltage received signal 454 is filtered prior to being received by the ADC 416. In some embodiments, the voltage received signal 454 may be received by a time to digital converter (TDC) (not shown) to provide a digital representation of the time that the voltage received signal 454 is received.

Photodiode 402, in an embodiment, receives each optical waveform 152, or a portion of each optical waveform 152, directly from the transmitter 102 and converts each optical waveform 152 into current reference signal 462 (a current that is proportional to the intensity of the received light directly from transmitter 102). TIA 404 is configured to receive current reference signal 462 and convert the current reference signal 462 into a voltage signal, designated as voltage reference signal 464 that corresponds with the current reference signal 462. ADC 406 is configured to receive the voltage reference signal 464 and convert the voltage reference signal 464 from an analog signal into a corresponding digital signal, designated as digital reference signal 466. Additionally, in some embodiments, the current reference signal 462 is filtered (e.g., band pass filtered) prior to being received by the TIA 404 and/or the voltage reference signal 464 is filtered prior to being received by the ADC 406. In some embodiments, the voltage reference signal 464 may be received by a TDC (not shown) to provide a digital representation of the time that the voltage reference signal 464 is received.

The processor 408 is any type of processor, controller, microcontroller, and/or microprocessor with an architecture optimized for processing the digital received signal 456 and/or the digital reference signal 466. For example, the processor 408 may be a digital signal processor (DSP), a central processing unit (CPU), a reduced instruction set computing (RISC) core such as an advanced RISC machine (ARM) core, a mixed signal processor (MSP), a field programmable gate array (FPGA), etc. In some embodiments, the processor 408 is a part of the controller 112. The processor 408, in an embodiment, acts to demodulate the digital received signal 456 and the digital reference signal 466. In some embodiments, the processor 408 may also receive the digital representation of the times that the voltage received signal 456 and the digital reference signal 466 were received. The processor 408 then determines, in an embodiment, the distance to one or more of objects, such as objects 206, 208, 210, and/or 212 by, as discussed above, performing a correlation function using the reference signal and the received signal. A peak in the correlation function corresponds to the time delay of each received reflected optical waveform 152 (i.e., the TOF). The distance to the objects within the FOV 106 can be estimated using the formula discussed above. In other embodiments, an FFT is performed on the received digital signal 456. A phase of the tone is then used to estimate the delay (i.e., TOF) in the received signals. The distance can then be estimated using the formula discussed above.

Figure 5:
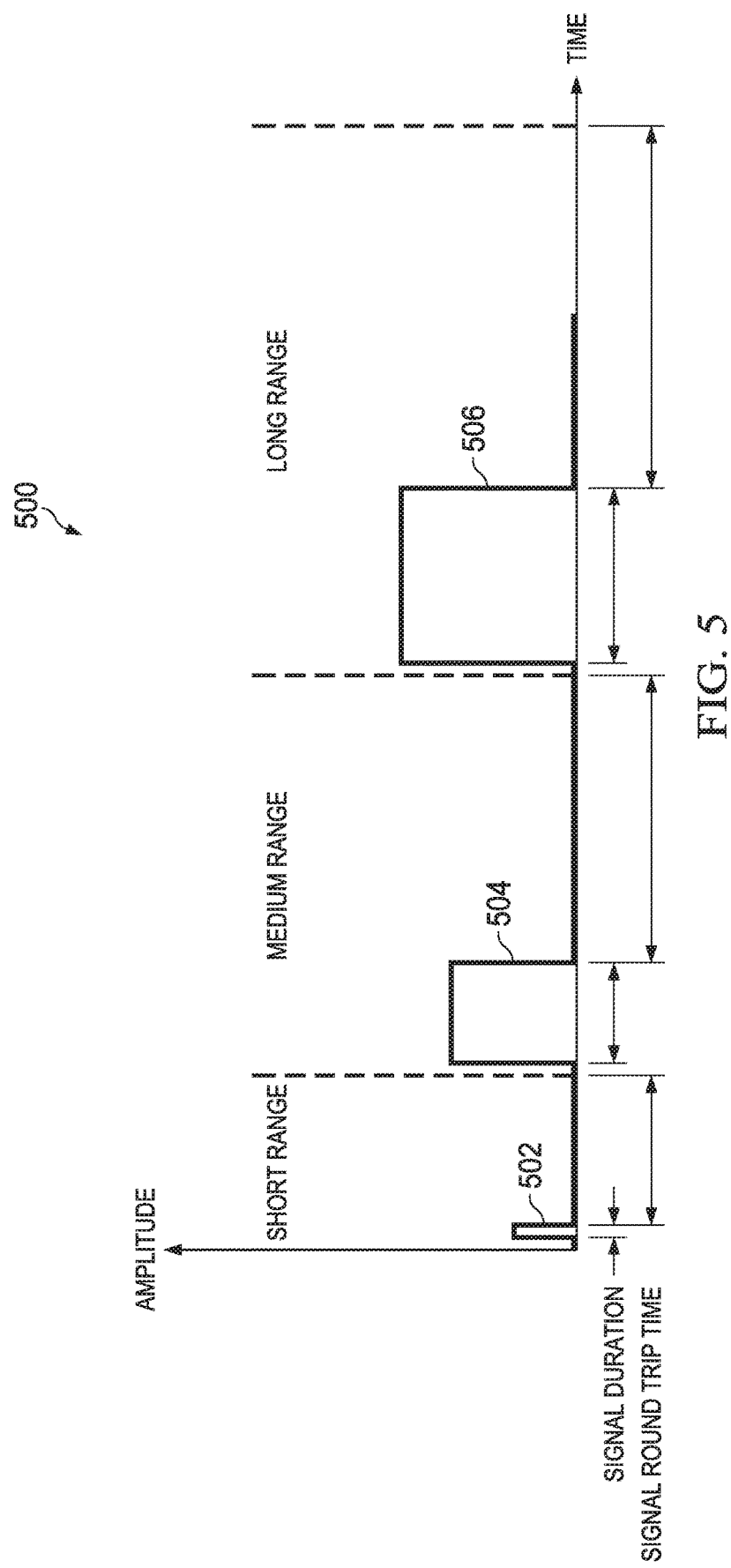
FIG. 5 shows an illustrative amplitude versus time graph for various range scans in accordance with various examples.

FIG. 5 shows an illustrative amplitude versus time graph 500 for various range scans in accordance with various examples. The example graph 500 includes three different ranges to scan, a short range (e.g., less than 10 meters) scan, a medium range (e.g., between 10 meters and 30 meters) scan, and a long range (e.g., greater than 30 meters) scan. For short ranges, a single pulse 502 is generated and transmitted as optical waveform 152. For medium ranges, a sequence of pulses and/or a continuous amplitude modulated waveform 504 is generated and transmitted as optical waveform 152. Similarly, for long ranges, a sequence of pulses and/or a continuous amplitude modulated waveform 506 is generated and transmitted as optical waveform 152. As discussed above and as shown in graph 500, as the range increases in distance from the transmitter 102, the amplitude of the generated optical waveform increases as well. Thus, in graph 500, the short range pulse 502 has the lowest amplitude, the long range signal 506 has the highest amplitude, and the medium range signal 504 has an amplitude that is between the amplitude of the pulse 502 and the signal 506.

Furthermore, as discussed above and as shown in graph 500, as the desired range increases in distance from the transmitter 102, the signal duration of the generated optical waveform increases as well. Thus, in graph 500, the short range pulse 502 has the shortest signal duration, the long range signal 506 has the longest signal duration, and the medium range signal 504 has a signal duration that is between the signal duration of the pulse 502 and the signal 506. In some embodiments, the same signal duration of generated optical waveforms may be utilized for different range scans. However, in these embodiments, as discussed above, the amplitudes can be different (e.g., higher) for longer range scans than for shorter range scans (e.g., lower).

Additionally, as discussed above and as shown in graph 500, as the desired range increases in distance from the transmitter 102, the signal round trip time from the transmitter 102 to an object and back to the receiver 110 also increases. Thus, in graph 500, the short range pulse 502 has the shortest round trip time, the long range signal 506 has the longest round trip time, and the medium range signal 504 has a round trip time that is between the round trip time of the pulse 502 and the signal 506. Because the signal repetition frequency is inversely proportional to the round trip time, the short range scan has the highest signal repetition frequency, the long range scan has the lowest signal repetition frequency, and the medium range scan has a signal repetition frequency that is between the signal repetition frequency of the short range scan and the long range scan.

While three different ranges to be scanned are shown in FIG. 5, any number of ranges to be scanned may be defined, and the generated optical waveforms 152 may be optimized for each of these ranges. Thus, the optical distance measuring system 100 may generate an optimized optical waveform 152 for any range. In other words, as the desired distance from the transmitter 102 of a scan increases in length, the optical waveform 152 may be accordingly optimized.

Figure 6:
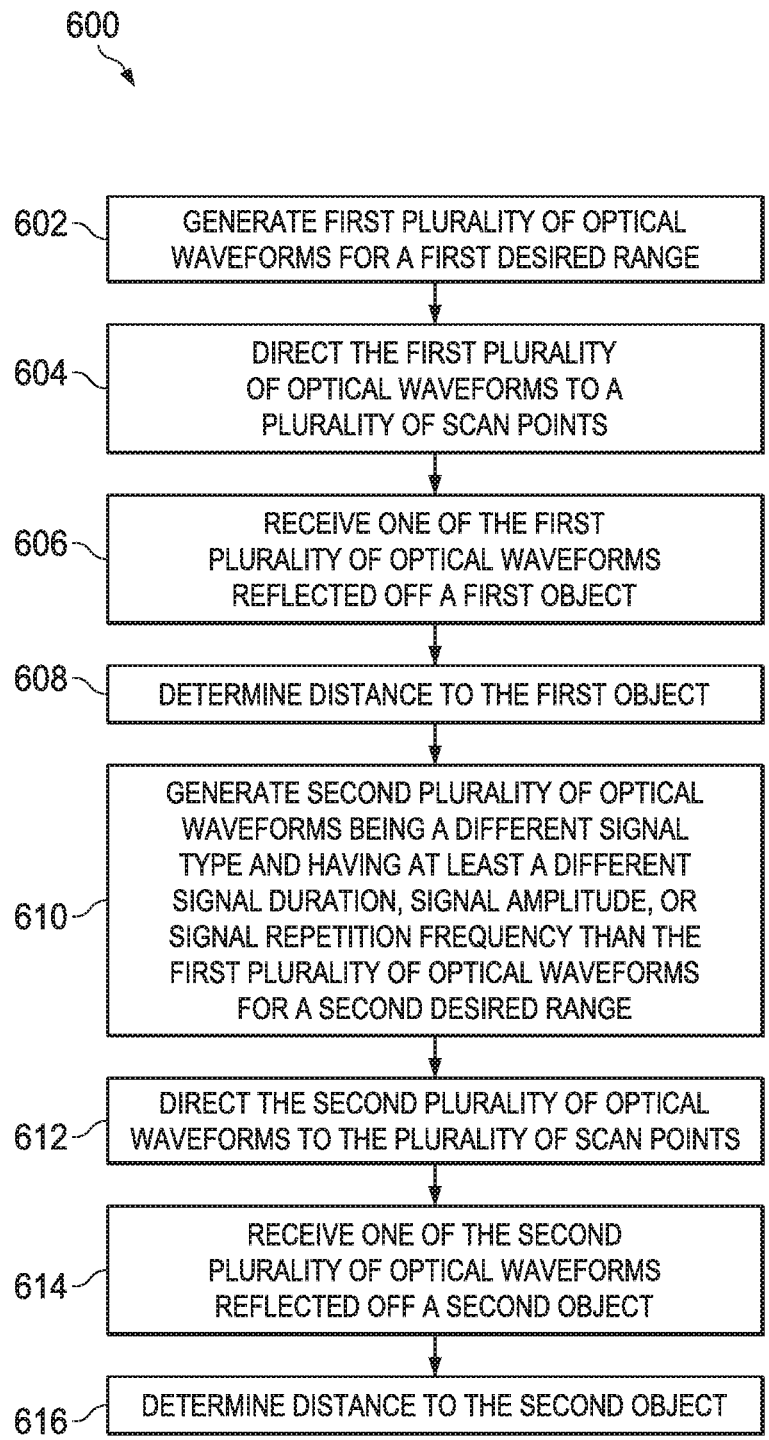
FIG. 6 shows an illustrative flow diagram of a method for determining a distance to a plurality of objects in accordance with various examples.

FIG. 6 shows an illustrative flow diagram of a method 600 for determining a distance to a plurality of objects in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, are performed by the transmitter 102 (including the modulation signal generator 302, signal generator 304, transmission driver 306, laser diode 308 and/or the optics device 310), the receiver 110 (including the optics device 410, photodiodes 402 and/or 412, TIAs 404 and/or 414, ADCs 406 and/or 416, and/or processor 408), and/or the controller 112 and implemented in logic and/or by a processor executing instructions stored in a non-transitory computer readable storage medium.

The method 600 begins in block 602 with generating a first plurality of optical waveforms for a first desired range. For example, the transmitter 102 generates optical waveforms 152. The first plurality of optical waveforms are of a first type (e.g., a single pulse, a sequence of pulses, and/or continuous amplitude modulated waveforms) with a first signal duration, a first signal amplitude, and a first signal repetition frequency. The first type, the first signal duration, the first signal amplitude, and the first signal repetition frequency are based on the first desired range. For example, if the first desired range is a short range (e.g., less than 10 meters), the first plurality of optical waveforms are single pulses with a relatively short signal duration, a relatively low signal amplitude, and a relatively high signal repetition frequency.

In block 604, the method 600 continues with directing the first plurality of optical waveforms toward a plurality of scan points that form a scan region. For example, the optics device 310 is, in an embodiment, configured to direct the first set of optical waveforms 152 directly to the scan region 202 or to a beam steering device that further steers the first set of optical waveforms 152 to the scan region 202.

The method 600 continues in block 606 with receiving one of the first plurality of optical waveforms reflected off a first object within the scan region. For example, the receiver 110 receives the reflected optical waveforms 152 after being reflected off an object within the scan region 202. In some embodiments, the first object is at or closer to the transmitter 102 than the first desired range. In other words, the first object is within the desired range of the scan. The method 600 continues in block 608 with determining the distance to the first object based on the TOF of the one reflected optical waveform of the first plurality of optical waveforms. For example, the receiver 110 converts the one reflected optical waveform 152 that is reflected off the first object reflected into a received electrical signal, such as received digital signal 456, and determines the TOF of this one reflected optical waveform 152 based on a comparison between a reference signal corresponding to the optical waveform 152 received directly from the transmitter 102 with the received electrical signal. The distance is then determined based on the TOF.

In block 610, the method 600 continues with generating a second plurality of optical waveforms for a second desired range. The second plurality of optical waveforms are of a second type (e.g., a single pulse, a sequence of pulses, and/or continuous amplitude modulated waveforms) with a second signal duration, a second signal amplitude, and a second signal repetition frequency. The second type, the second signal duration, the second signal amplitude, and the second signal repetition frequency are based on the second desired range. Additionally, in an embodiment, the second type, the second signal duration, the second signal amplitude, and the second signal repetition frequency are different than the first type, the first signal duration, the first signal amplitude, and the first signal repetition frequency. For example, if the second desired range is a longer range (e.g., greater than 10 meters), the second plurality of optical waveforms are a sequence of pulses and/or continuous amplitude modulated waveforms with, in some embodiments, a relatively longer signal duration, a relatively higher signal amplitude, and/or a relatively lower signal repetition frequency.

In block 612, the method 600 continues with directing the second plurality of optical waveforms toward the plurality of scan points that form the scan region. For example, the optics device 310 is, in an embodiment, configured to direct the second set of optical waveforms 152 directly to the scan region 202 or to a beam steering device that further steers the second set of optical waveforms 152 to the scan region 202.

The method 600 continues in block 614 with receiving one of the second plurality of optical waveforms reflected off a second object within the scan region. For example, the receiver 110 receives the second set of reflected optical waveforms 152 after being reflected off an object within the scan region 202. In some embodiments, the second object is further from the transmitter 102 than the first desired range. In other words, the second object is at a distance further from the transmitter than the first desired range, but is within the second desired range. The method 600 continues in block 616 with determining the distance to the second object based on the TOF of the one reflected optical waveform of the second plurality of optical waveforms. For example, the receiver 110 converts the one reflected optical waveform 152 that is reflected off the second object reflected into a received electrical signal, such as received digital signal 456, and determines the TOF of this one reflected optical waveform 152 based on a comparison between a reference signal corresponding to the optical waveform 152 received directly from the transmitter 102 with the received electrical signal. The distance is then determined based on the TOF.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:
1. A system, comprising:
   an optical transmitter configured to:
      in response to determining that a first target range is less than a threshold distance, set at least one first characteristic of first optical waveforms to comprise a single tone;
      produce the first optical waveforms; and direct the first optical waveforms toward a first scan region during a first scan; and a receiver configured to receive a reflection of the first optical waveforms;

wherein the optical transmitter is further configured to:
in response to determining that a second target range is greater than the threshold distance, set at least one second characteristic of second optical waveforms to comprise a pulse sequence or continuous amplitude modulation;
produce the second optical waveforms; and
direct the second optical waveforms toward a second scan region during a second scan, after the receiver receives the reflection of the first optical waveforms; and wherein the receiver is further configured to receive a reflection of the second optical waveforms.

2. The system of claim 1, wherein the receiver is further configured to determine a first distance to a first object based on a first time of flight from the optical transmitter to the first object and back to the receiver and to determine a second distance to a second object based on a second time of flight from the optical transmitter to the second object and back to the receiver.

3. The system of claim 2, wherein the at least one first characteristic comprises a first signal duration and the at least one second characteristic comprises a second signal duration, the first signal duration being less than the second signal duration.

4. The system of claim 2, wherein the at least one first characteristic comprises a first signal amplitude and the at least one second characteristic comprises a second signal amplitude, the first signal amplitude being less than the second signal amplitude.

5. The system of claim 2, wherein the at least one first characteristic comprises a first signal repetition frequency and the at least one second characteristic comprises a second signal repetition frequency, the first signal repetition frequency being greater than the second signal repetition frequency.

6. The system of claim 1, wherein the optical transmitter is configured to produce the first optical waveforms with a different signal type, signal duration, signal amplitude, and signal repetition frequency than the second optical waveforms.

7. The system of claim 6, wherein the signal type, signal duration, signal amplitude, and signal repetition frequency of the first optical waveforms is based on the first target range, and the signal type, signal duration, signal amplitude, and signal repetition frequency of the second optical waveforms is based on the second target range.

8. The system of claim 1, wherein the receiver is configured to ignore a portion of the reflection of the first optical waveforms, wherein the portion of the reflection of the first optical waveforms is reflected from farther than the threshold distance.

9. The system of claim 8, wherein the receiver is configured to ignore a portion of the reflection of the second optical waveforms, wherein the portion of the reflection of the second optical waveforms is reflected from closer than the threshold distance.

10. A system comprising:
a laser diode;
a signal generator coupled to the laser diode, the signal generator configured to, in response to determining that a first target range is less than a threshold distance, produce first electrical signals instructing the laser diode to produce first optical waveforms having at least one first characteristic to comprise a single tone;
the laser diode configured to produce the first optical waveforms responsive to the first electrical signals; and
an optics device coupled to the laser diode, the optics device configured to receive the first optical waveforms and direct the first optical waveforms toward first scan points that form a first scan region within a field of view (FOV) during a first scan, wherein the signal generator is further configured to, in response to determining that a second target range is greater than the threshold distance, produce second electrical signals instructing the laser diode to produce second optical waveforms having at least one second characteristic to comprise a pulse sequence or continuous amplitude modulation, after the optics device directs the first optical waveforms towards the first scan points;

wherein the laser diode is further configured to produce the second optical waveforms responsive to the second electrical signals; and wherein the optics device is further configured to receive the second optical waveforms and direct the second optical waveforms toward a second scan points that form a second scan region within the FOV during a second scan.

11. The system of claim 10, wherein the at least one first characteristic comprises a first signal amplitude, the at least one second characteristic comprises a second signal amplitude, and the first signal amplitude is less than the second signal amplitude.

12. The system of claim 10, wherein the at least one first characteristic comprises a first signal repetition frequency, the at least one second characteristic comprises a second signal repetition frequency, and the first signal repetition frequency is greater than the second signal repetition frequency.

13. A method comprising:
in response to determining that a first target range is less than a threshold distance, setting, by an optical transmitter, at least one first characteristic of first optical waveforms to comprise a single tone;
producing, by the optical transmitter, the first optical waveforms;
directing the first optical waveforms toward first scan points that form a first scan region within a field of view (FOV) in a first scan;
in response to determining that a second target range is greater than the threshold distance, setting, by the optical transmitter, at least one second characteristic of second optical waveforms to comprise a pulse sequence or continuous amplitude modulation;
producing, by the optical transmitter, the second optical waveforms after directing the first optical waveforms toward the first scan points; and
directing the second optical waveforms toward a second plurality of scan points that form a second scan region within the FOV in a second scan.

14. The method of claim 13, further comprising:
receiving a reflection of one of the first optical waveforms reflected off of a first object within the first scan region; and
determining a distance to the first object based on a time of flight of the one of the first optical waveforms.

15. The method of claim 14, the method further comprising:

receiving a reflection of one of the second optical waveforms reflected off of a second object within the second scan region; and determining a distance to the second object based on a time of flight of the one of the second optical waveforms, wherein the first object is located within the first scan region at or closer to the optical transmitter than the first target range and the second object is located further from the optical transmitter than the first target range.

16. The method of claim 15, further comprising ignoring a portion of the reflection of the first optical waveforms, wherein the portion of the reflection of the first optical waveforms is reflected from farther than the threshold distance.

17. The method of claim 16, further comprising ignoring a portion of the reflection of the second optical waveforms, wherein the portion of the reflection of the second optical waveforms is reflected from closer than the threshold distance.

18. The method of claim 13, wherein the at least one first characteristic comprises a first signal amplitude and a first signal repetition frequency, the at least one second characteristic comprises a second signal amplitude and a second signal repetition frequency, the method further comprising, in response to a determination that the second target range is less than the first target range:

the second signal duration is less than a round trip time of the first optical waveforms;

the second signal amplitude is less than the first signal amplitude; and the second signal repetition frequency is greater than the first signal repetition frequency.

19. The method of claim 13, wherein the at least one first characteristic comprises a first signal amplitude and a first signal repetition frequency, the at least one second characteristic comprises a second signal amplitude and a second signal repetition frequency, the method further comprising, in response to a determination that the second target range is less than the first target range:

the second signal duration is less than a round trip time of the first optical waveforms;

the second signal amplitude is greater than the first signal amplitude; and the second signal repetition frequency is greater than the first signal repetition frequency.

* * * * *